Nov. 14, 1967 D. E. CALKINS 3,352,274
HIGH SPEED FAIRED TOWING CABLE
Filed March 3, 1966
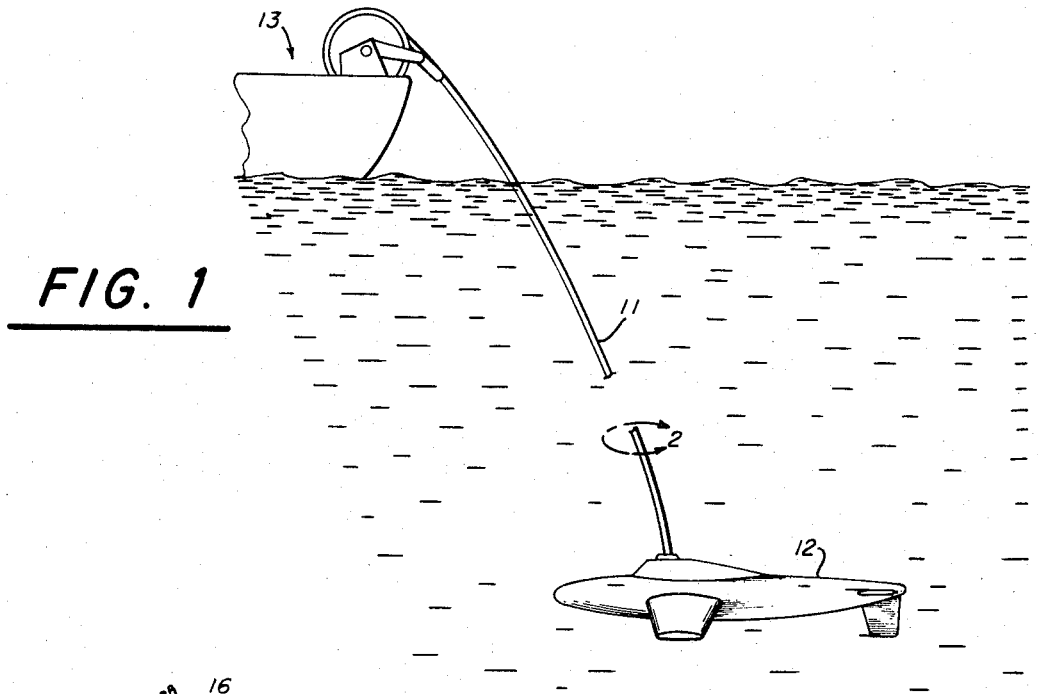
FIG. 1
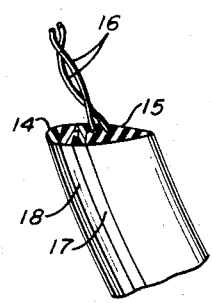
FIG. 2
FIG. 3
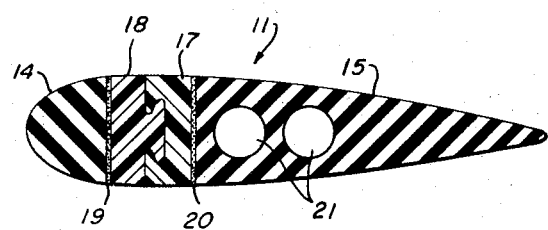
FIG. 4
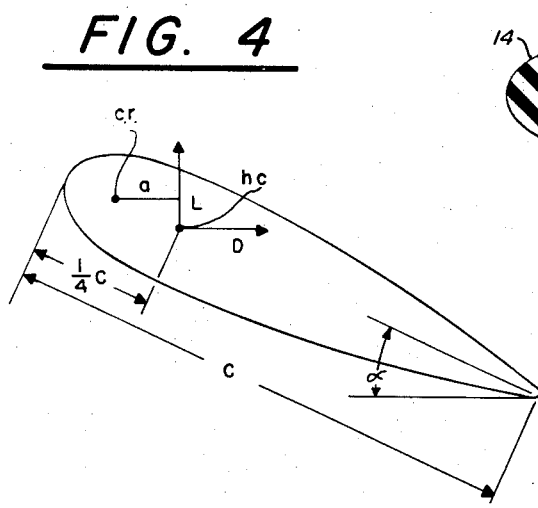
INVENTOR.
DALE E. CALKINS
BY J. Peter Mohn
AGENT
ATTORNEYS

United States Patent Office 3,352,274
Patented Nov. 14, 1967

3,352,274
HIGH SPEED FAIRED TOWING CABLE
Dale E. Calkins, San Diego, Calif., assignor to the United States of America as represented by the Secretary of the Navy
Filed Mar. 3, 1966, Ser. No. 533,380
6 Claims. (Cl. 114—235)

ABSTRACT OF THE DISCLOSURE

A low drag underwater towing cable having a high stability at high towing speeds. The cable comprises an elongated hydrofoil-shaped structure having leading edge and trailing edge portions. The leading and trailing portions are slideably engaged with each other along a plane located forward of the hydrodynamic center of the hydrofoil shape. The leading portion is the load bearing member. Because of the sliding connection tensional loads are confined to areas forward of the hydrodynamic center, a desirable stability criteria.

---

This invention relates to an underwater towing cable and more particularly to a streamlined, low-drag cable for towing an object underwater at high speed.

In many naval operations it is often desired to tow a submerged object at a relatively high speed. In particular, the class of objects which are towed underwater may comprise sonar hydrophones and consequently, for useable information to be received from the hydrophone, the production of spurious noise signals must be minimized. If turbulence is produced around the cable during the towing operation, underwater noise is generated which may obscure the signals which the hydrophone is intended to detect. Therefore a suitable underwater cable must be capable of being towed through the water at high speed with a minimum amount of turbulence. Furthermore the total drag of the cable must be relatively low to prevent a towing craft's speed capabilities from being materially reduced.

A further consideration in the design of an underwater towing cable is the fact that the cable must be stable during the towing operation. The resultant forces on the cable must tend to keep the cable submerged and moving along the desired towing path. If the latter condition is not met, resultant forces may develop which tend to surface the moving cable.

Many solutions have been offered to the above noted problems by the prior art, however as increased towing speeds are made possible by increased surface speed capabilities of towing craft, the prior art cables tend to become inadequate and unsatisfactory in performance. To date, the most common approach to the solution of the above problems has been providing the cable with a plurality of streamlined fairings displaced along its length. Not only has such an approach proved to be unsatisfactory hydrodynamically at high speeds but providing such assemblies with passageways for electrical cables becomes cumbersome due to the relative movements of the individual fairings.

An object of the present invention therefore is to provide a cable assembly for towing an object underwater at high speeds.

Another object of the present invention is to provide a stable low-noise and low-drag cable for towing submerged objects.

A more particular object of the present invention is to provide a streamlined, stable, low-noise cable for towing a submerged sonar hydrophone.

A still object of the present invention is to provide a streamlined underwater towing cable which is readily adaptable to receive and carry electrical conductors.

The instant invention provides a solution to the above noted problems and objects by providing an elongated integral cable and fairing assembly of streamlined cross section. The assembly essentially comprises a leading edge tension member and a trailing edge member for streamlining and accommodating the electrical cables. The leading and trailing sections are slideably engaged with each other. The key to the stable operation of the instant cable stems from the fact that the sliding joint between the leading and trailing sections is located in a plane which is forward of the quarter chord point of the overall streamlined, or airfoil shaped, cross section of the assembly.

The theory, construction and scope of the present invention will be more fully understood from the following detailed description and accompanying drawings in conjunction with the appended claims.

In the drawings:
FIG. 1 is a pictorial diagram of the typical environment for the cable of the present invention;
FIG. 2 is a blown-up view of a portion of the cable shown in FIG. 1;
FIG. 3 is a cross-sectional view showing the construction of the cable;
FIG. 4 is a schematic representation of some of the forces acting on the instant cable.

As shown in FIG. 1, the particular use for which the cable 1 is designed, is to tow a submerged object 12 behind some surface towing craft 13. In particular, the submerged object 12 may normally be some type of sonar hydrophone used for underwater surveillance in a naval defense program. The depth at which the object 12 is towed may be on the order of hundreds of feet and consequently the cable lengths involved are considerable. For maximum efficiency of the surveillance operation it is obviously desirable for the surface towing craft 13 to operate at a relatively high speed.

As shown in FIG. 2, which is a blow-up at the area shown at 2 in FIG. 1, the cable structure essentially comprises a leading edge portion 14 which is slideably engaged with a trailing portion 15. The details of the construction of the leading and trailing portions 14 and 15, respectively, as well as the sliding engagement between the two will be explained in detail with reference to FIG. 3. The trailing portion 15 is provided with passageways for receiving communications and control cables 16. It should be understood that cables 16 do not contribute to the structural design of the overall towing cable but merely provide electrical contact between the towed object 12 and the towing craft 13.

The constructional details of the cable of the present invention can be best understood from the cross-sectional view of same afforded by FIG. 3. It should first be noted that the same numerals are used in FIG. 3 to represent elements already briefly described in the previous figures.

Referring now to FIG. 3, the cable is shown to essentially comprise a leading edge tension supporting member 14 and trailing edge section 15. Between the leading and trailing portions, a pair of mated sliding strips 17 and 18 are bonded. The strips are interlocked by a mated dovetail arrangement which permits longitudinal movement of the strips but prohibits any lateral motion. Each of the strips or sections is bonded to the leading edge section and the trailing edge section of the cable, respectively, by some suitable cement at points 19 and 20. Cavities 21, which extend longitudinally throughout the cable length, are of such a size so as to accommodate desired electrical cables.

As previously mentioned, the leading edge tension member 14 essentially supports the entire load to which the cable is subjected. It must therefore be of sufficient strength to withstand such loading. A suitable material for the tension member would be an epoxy-glass-fiber substance such as that sold under the trademark "Formica FF91." The sliding members 17 and 18 were made of "Teflon" in one embodiment made in accordance with this invention. Of course, other materials could be chosen which would exhibit little frictional resistance when sliding together.

The trailing edge section 15 of the cable 11 must be of a relatively flexible substance such as one of the family of elastomers. A particular material found quite suitable for the trailing section was that sold under the trade name of "ETV Silicon Rubber." It should be noted that the above mentioned materials are merely examples of those suitable and the invention is not to be limited thereto.

Referring now to FIG. 4 the theory behind the operation of the cable will be explained. When discussing airfoil sections, forces such as lift, drag, etc. are defined in relation to a point in the airfoil commonly called the aerodynamic center and abbreviated A.C. When the airfoil is actually used in water, as in the instant case, it may more properly be designated as a hydrofoil with the aerodynamic center then being designated as the hydrodynamic center. For most sections, the hydrodynamic center lies at a distance about a quarter chord length back from the leading edge of the hydrofoil and is defined as the point about which the moment of the forces acting on the hydrofoil remains constant when the angle of attack is changed. This point is shown in FIG. 4 and labeled as H.C. The lift force L and the drag force D are shown in FIG. 4 to be acting on the hydrodynamic center. Another point of interest in discussing hydrofoils is the so-called shear center. The shear center is defined as the point at which a resultant shear load must act to produce deflection with no rotation. When the tension on a section of an hydrofoil is zero, the shear center by definition becomes the center of rotation of the hydrofoil. As hydrofoil section is placed under tension, however, the center of rotation does not remain fixed at the shear center and tends to move in proportion to the magnitude of the tension applied. In the instant application, since the hydrofoil section is to be used as a load supporting means, and is consequently under tension, the location of the center of rotation, c.r., is extremely important for reasons to be later discussed. In hydrofoil section under tension, still another point is of interest. This latter point is called the center of tension and is defined as the centroid of the tension field. When under tension, it is between this center of tension and the shear center at which the center of rotation can be found. In actuality the center of rotation moves to a point so close to the center of tension that the two may be described as being at the same point. As previously noted, a primary concern in the construction of a cable such as that of the present invention is that of stability. The term "stability" being used here to indicate the ability of the instant cable to maintain a straight course along the desired towing path devoid of any tendency to deflect away from such path. Such stability is determined by the location in the hydrofoil section of the various points described above. In particular it is imperative that the center of tension and the center of rotation be forward of the hydrodynamic center of the hydrofoil. Furthermore it is also desirable to have the shear center forward of the hydrodynamic center to allow for instances in which the tensional load is of nominal value. As indicated in FIG. 4, the hydrodynamic center is normally found to be at a point located one quarter of the chord length back from the leading edge of the section. This is shown in FIG. 4 as $\frac{1}{4}C$ where C is the total chord measurement. The previous requirement can therefore practically be restated to the effect that the center of rotation must be forward of the quarter chord point of the hydrofoil section. When such above noted conditions exist the cable maintains a straight path because of the fact that any deviation from that path is counteracted by restoring forces. For example, if the cable were being towed in the direction shown by V in FIG. 4 but it momentarily assumed the angle of attack $\alpha$ shown therein, it can readily be noticed that the force L, or lift force, acting along moment arm $a$ to the center of rotation results in a restoring torque which tends to direct the cable back towards the intended direction V. If the center of rotation were not forward of the hydrodynamic center as shown, the resultant torque in the above situation would tend to increase the angle $\alpha$ and therefore force the cable further off its intended course.

With the above theoretical considerations in mind, it is now readily apparent how the instant invention achieves the necessary conditions for effective operation. In particular, by utilizing the sliding joint between the leading and trailing edges of the instant cable and using the leading edge to support all of the load, the center of tension and consequently the center of rotation is always maintained forward of the quarter chord point since the sliding axis is at or forward of the quarter chord point itself. Minimum tensional loads are therefore transmitted to the trailing section since such forces will not be transmitted through the sliding connection. To maintain the shear center forward of the hydrodynamic center, the material of which the trailing section is constructed is made substantially flexible while the leading edge tension member is relatively rigid. This results in the static or no-load shear center also being forward of the quarter chord point.

It can therefore be noted that in accordance with the present invention a high speed underwater towing cable may be constructed which has low drag and a very low figure of noise generation because of its smooth streamlined shape and furthermore is stable in operation because of its sliding joint and other structional features.

It should also be noted that because of the somewhat flexible nature of the overall cable, it is readily adaptable to being stored on a drum of sufficient diameter.

It should be understood that although the invention has been described in the form of one particular embodiment, it should not be limited thereto for modifications and changes could be made by one skilled in the art without departing from the spirit and scope of this invention as defined in the following claims.

What is claimed is:

1. An elongate load bearing cable for towing an object underwater at high speeds comprising:
    an elongate leading edge tension member of sufficient length to connect said object and a vessel on the surface of a body of water capable of withstanding the towing load of an underwater object,
    an elongated trailing edge member of relatively flexible material,
    means for slidably engaging said leading edge member with said trailing edge member continuously along a plane parallel to the elongate dimension of said cable,
    said engaged leading and trailing edge members having an overall streamlined hydrofoil cross-sectional shape,
    said hydrofoil cross-section having an inherent hydrodynamic center,
    said plane being located forward of said hydrodynamic center of said hydrofoil cross section.

2. The cable of claim 1 wherein said hydrofoil shape is symmetrical whereby said hydrodynamic center is located at the one-quarter chord point of said hydrofoil.

3. The cable of claim 1 wherein said means for slidably engaging said leading and trailing edge members comprises a pair of elongate mated dovetailed strips,
    each of said strips being bonded to a respective one of said leading and trailing edge members.

4. The cable of claim 3 wherein said strips are constructed of a material having a low frictional resistance to sliding movement.

5. The cable of claim 2 wherein said leading edge member is made of an epoxy-glass-fiber material, and said trailing edge member is made of a flexible rubber-like substance.

6. The cable of claim 2 wherein said trailing edge member is provided with internal elongate cavities extending along an axis parallel to said elongate dimension of said cable and adapted to accommodate electrical cables therein.

References Cited

UNITED STATES PATENTS 2,435,956  2/1948  Craig _____ 114—235 X
3,241,513  3/1966  Rather et al. _____ 114—235

MILTON BUCHLER, *Primary Examiner.*

T. M. BLIX, *Examiner.*